United States Patent Office 3,112,828
Patented Dec. 3, 1963

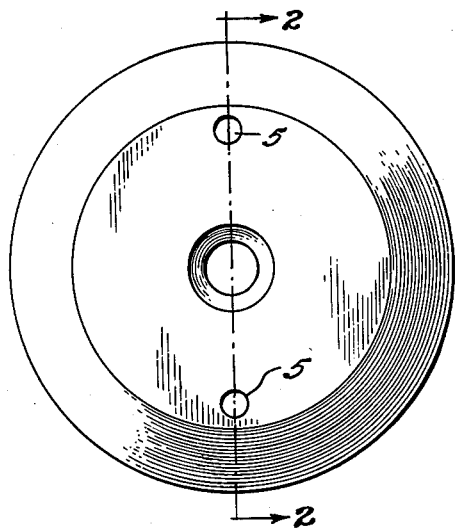
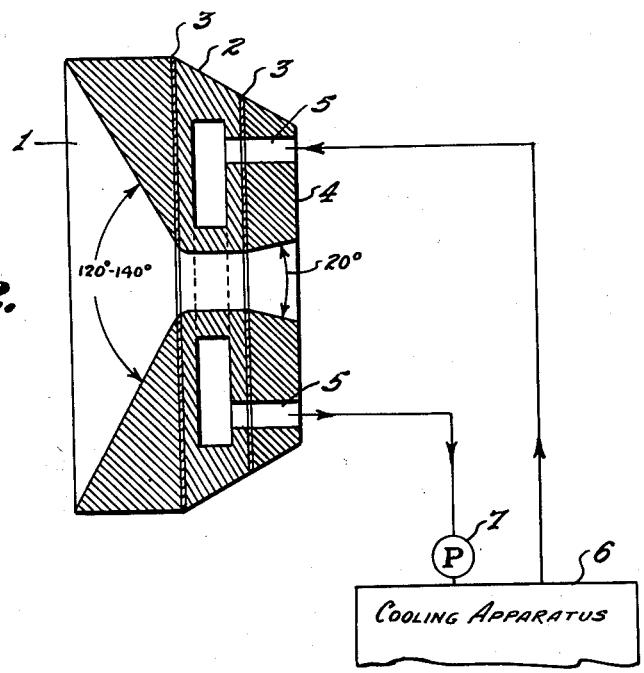

3,112,828
EXTRUSION DIES
Oscar R. Zipf, Dayton, Ohio, assignor to
Fred L. Hill, Dayton, Ohio
Filed Feb. 9, 1959, Ser. No. 792,225
1 Claim. (Cl. 207—10)

My invention relates to extrusion dies and particularly to a novel type of extrusion die that makes possible significant improvements in the extrusion of metals such as titanium, zirconium, molybdenum, niobium, etc. These metals are reactive and have high melting points and require high extrusion temperatures. The present state of the art is such that die life is very short and extrusion surface finishes are something less than desirable. This application is a continuation-in-part of my application Serial No. 485,667 filed February 2, 1955 and now abandoned.

It is my object to provide a beryllium copper base alloy die, choosing this material because of its high heat conductivity and its compatability with the metals I propose to extrude and because beryllium copper base alloy increases in hardness and tensile strength at sub-zero temperatures.

It is my object to provide means for cooling this die and operating it during the extrusion pass at temperatures which range from −50° to −300° F. depending on the material and the shape of the extrusion to be extruded.

It is my object to make a die of beryllium copper base alloy and refrigerated to temperatures in the above mentioned range, the co-efficient of friction being reduced to such an extent that the material will pass through the die very readily and come through with a smooth surface and very small difference in diameter from the die opening.

It is my object during extruding because of the material of which the die is made and the low temperature at which it operates, to minimize "pick-up" or sticking of the extrusion material to the die which causes the extruded part to deform and perceptibly shortens the life of the die.

It is my object by using a beryllium copper base alloy die as described above, to provide a die which will remain in continuous operation for a large number of extrusion passes and will give a finished extrusion of low tolerance.

The present state of the art in extruding titanium does not provide a smooth surface, close tolerance and long die life. The Ugine-Sejournet process which was patented in France has been tried out in this country on a licensee basis with indifferent results. This process consists of wrapping the heated billet to be extruded with a layer of fibre glass and during the extrusion process the glass melts giving a certain degree of lubrication to the hot metal as it passes through the die. The resulting extrusion is heavily covered with a glaze of glass with a wide tolerance from the desired dimensions and requires cleaning and machine finishing before it can be used.

It is known to coat a titanium billet with a thin layer of copper, the copper melting during extrusion process giving a degree of lubrication as the titanium passes through the die. This is made possible because of the much lower melting point of copper than the heat of the titanium billet during the extrusion period. The difficulty with this process is much the same as the process using glass as a lubricant described above, for the ensuing extrusion is contaminated with copper which must be removed and the extrusion machined down to desired shape.

While titanium and zirconium have been extruded, these extrusions are very crude with a very rough surface and very expensive. The steel dies through which the titanium is extruded only lasts for one or two extrusion passages and then must be either re-worked or discarded because of the tearing action of the hot titanium on the steel as it passes through the die.

I have demonstrated that using a beryllium copper base alloy die refrigerated below zero that the resulting extrusion has a high degree of accuracy and a smooth surface finish. The physical properties of the extruded titanium were of a high order. Using a necessary heat exchanger and with a proper selection of refrigerant, I provide a beryllium copper base die which can be located in an extrusion press which will function successfully over a long period of time before the die must be reworked or discarded because of wear, and the resulting extrusions will be of smooth finish and very close tolerance.

At the present time most existing extrusion presses have been designed for aluminum and operate at low ram speeds. Conventional dies fail rapidly in attempts to extrude metals such at titanium, zirconium, niobium, etc. Such failure is so pronounced that these metals are not used for the many desirable purposes for which they are eminently adaptable. The few existing high speed presses expressly designed for the extrusion of high temperature metals does little better in meeting the quality standards expected in commercial extrusions.

It is the object of my invention to provide an extrusion die which incorporates the use of beryllium copper base alloy die material using the "phenomena" of markedly increased hardness and tensile strengths of said alloy at sub-zero temperatures. This die will operate at these very low temperatures which permits the extrusion of high temperature billets by maintaining its hardness and tensile strength and by another natural phenomena that of marked reductions in friction between very hot and very cold objects in contact with each other. The use of beryllium copper base alloy allows a maximum flow of heat from the die to the cooling medium because of its superior heat conductivity. The beryllium copper base alloy die is provided with passages to permit the flow of liquid air, nitrogen, argon, helium, etc., to maintain these sub-zero temperatures during the extrusion cycle. Cooling will be accomplished by the use of a two cycle refrigerating system using a heat exchanger to circulate the liquid refrigerant through the die at very low temperature and pressure. I provide a steel entrance cone which will be insulated from the die by a thin layer of insulating material such as mica, thermosetting plastic, etc., in order to maintain a wide temperature gradient between the billet and the die to prevent billet freezing and excessive extrusion pressures. The die will have a steel follower plate copper brazed to the die to aid in the support of the die; the follower plate will have adequate clearance to permit progress of the extrusion without contact with the follower plate. This die will permit the use of both the high speed extrusion presses and the slower speed presses now available for the extrusion of titanium, zirconium, niobium, etc.

The cooling of an extrusion die with cooling water is very old being first suggested in the Crooke Patent No. 54,121, patented April 21, 1866. Such die was for shaping solder having a melting point of around 300° F. The problem of extruding high temperature metals such as titanium and zirconium cannot be effected with any normal steel die cooled with water. With high temperature metal extrusion I have found that the extrusion die is preferably composed of a beryllium copper base alloy cooled to a sub-zero temperature. It is within the range of metallurgical research expectancy that other alloys having equivalent properties a beryllium copper alloy will be produced in the future so that in the claims which follow when I use the words "beryllium copper base alloy" it should be understood that the particular beryllium alloy which I have found preferable is a beryllium-copper alloy, but that I include within the scope of my invention other alloys having equivalent properties. These properties must include a high resistance to thermal shock. This exposure of the high melting point metal to the cold beryllium copper base alloy extrusion die permits the formation of a surface finish on the metal which is so smooth and clean that machining to provide and acceptable surface finish is normally unnecessary.

The foregoing objects and other objects to which reference will be made in the ensuing description I accomplish by the use of that certain combination of parts of which I have illustrated a preferred embodiment.

In the drawings:

FIGURE 1 is a front plan view of a preferred extrusion die.

FIGURE 2 is a horizontal sectional view taken along the lines 2—2 of FIGURE 1.

The alloy steel entrance cone is indicated at 1. The beryllium copper base alloy extrusion die 2 is separated from the steel entrance cone by insulating material as indicated at 3. A steel follower die 4 may be brazed to the beryllium copper die, and has the desired shape for the desired extrusion. The passage 5 for the refrigerant liquid gas extends in through the follower die and connects with the passage in the beryllium copper alloy extrusion die.

A source of liquid refrigerant is diagrammatically indicated at 6 with a pipe connecting with a passage 5. A suction pump 7 is also indicated to circulate the refrigerant through the passage 5 and return it to the liquid heat exchanger which is maintained at sub-zero temperature by the refrigerating compressor.

In my extrusion process I have observed that the co-efficient of friction between the billet and the beryllium copper base alloy die is greatly reduced due to this great difference in temperautre. While it is known that the co-efficient of friction is increased when the temperatures of opposite metals approach equilibrium I utilize the reverse of this principle and by this wide range of difference in temperature induce a condition in which there is so little friction that the beryllium copper appears to be "slippery" in comparison with other dies.

A die running at sub-zero temperatures is surprisingly effective with the high melting point metals. The actual difference in temperature in each case will be determined by the size and shape of the die opening and the various alloys which are to be extruded. It is essential that the die be refrigerated to a sub-zero temperature so as to produce a slippery non-frictional contact between the die and metal. Surprisingly this results in an unusually smooth clean surface on the extruded metal.

The merit of my invention is perhaps due to my incorporation in combination, of the following concepts:

(a) That by greatly increasing the temperature difference betwen the billet being extruded and the die by the refrigeration of the die to sub-zero temperature, I am able to greatly reduce the friction and this results in a smooth extruded surface finish to the metal and at the same time greatly increases the life of the extruding die.

(b) That by this wide temperature differential I avoid a "wetting action" or the sticking of the titanium or zirconium to the die thereby increasing the life of the die.

(c) By increasing the hardness of the beryllium copper base alloy die by refrigeration, I reduce to a minimum the eutectic reaction between the extruded metal and the die, so that the beryllium copper will better withstand the attack by reactive metals placed upon it during extrusion.

While the mechanism as far as its mechanical shape is concerned is simple, the composition of the materials and the use of the refrigerant adapted to cool the parts as suggested makes the difference between success and failure.

Having thus described my invention, what I claim as new and desire to secure by Letters Patent is:

The method of extruding high melting point reactive metals, comprising providing an extrusion die composed of metal characterized by high resistance to thermal shock, high thermal conductivity and compatability with the reactive metal to be extruded, cooling said die to a temperature within the range of −50° F. to −300° F., heating the reactive metal to extrusion temperature, and while extruding the reactive metal through the die, maintaining the latter within said temperature range.

References Cited in the file of this patent

UNITED STATES PATENTS

| | | |
|---|---|---|
| 635,026 | Saunders | Oct. 17, 1899 |
| 1,840,472 | Singer | Jan. 12, 1932 |
| 2,135,193 | Moorhead | Nov. 1, 1938 |
| 2,161,570 | Harris | June 6, 1939 |
| 2,397,168 | Touceda | March 26, 1946 |
| 2,558,035 | Bridgman | June 26, 1951 |
| 2,670,528 | Brunberg | March 2, 1954 |
| 2,753,261 | Goetzel et al. | July 3, 1956 |
| 2,806,596 | Dodds et al. | Sept. 17, 1957 |
| 2,974,778 | Ellis et al. | March 14, 1961 |

FOREIGN PATENTS

| | | |
|---|---|---|
| 127,674 | Australia | May 3, 1948 |
| 579,217 | Germany | June 22, 1933 |

OTHER REFERENCES

"Refrigeration and Air Conditioning," by Richard C. Jordan and Gayle B. Priester, Prentice-Hall, Inc., New York, c. 1948, p. 360

"The Extrusion of Titanium," by Alvin M. Sabroff, W. Maxwell Parris and Paul D. Frost, March 1955, WADC Technical Report 54–555, 68pp.